3,734,828
PROCESS FOR THE SEPARATION AND PURIFICATION OF RIBOFLAVINYL GLYCOSIDES
Toshio Miyake, Okayama, and Yukio Suzuki, Kurashiki, Japan, assignors to Hayashibara Company, Okayama, Japan
No Drawing. Filed Mar. 31, 1971, Ser. No. 130,035
Claims priority, application Japan, Mar. 31, 1970, 45/27,328
Int. Cl. C07d 57/32
U.S. Cl. 195—28 R 4 Claims

ABSTRACT OF THE DISCLOSURE

Process for recovering and purifying riboflavinyl glycosides which are produced by subjecting transglucosidase to a mixture solution of carbohydrates and riboflavin, which comprises crystallizing riboflavin by means of reduction concentration thereby removing the crystallized riboflavin, adding hydrosulfite to the crystallized riboflavin to give reduced riboflavinyl glucosides in crystal forms, separating the product from the sugars, passing the resulting product through acidic- and moderately basic ion exchange resins thereby removing impurities, then concentrating and crystallizing the resulting product.

---

The present invention relates to a process for the separation and purification of riboflavinyl glycosides from mixture solutions containing riboflavinyl glycosides, riboflavin and saccharides. When compared with riboflavin, riboflavinyl glycosides are water soluble with greater ease, possess a higher light resistance and impart much less bitterness. In addition the actions of vitamin $B_2$ are identical to those of riboflavin.

The fact that various riboflavinyl glycosides are formed from the reactions of riboflavin (also known as vitamin $B_2$, and will be referred to as $VB_2$ hereinafter) and certain carbohydrates, such as oligosaccharides, polysaccharides and glycosides in the presence of certain enzymes is well known and is reported in the following literature. Biochemical Journal, 50, 433, (1952); the Journal of Vitaminology, 3, 264, (1957), ibid., 4, 126, (1958); ibid., 5, 1, (1959); ibid., 5, 8, (1959); ibid., 5, 13, (1959); ibid., 5, 298, (1959); ibid., 6, 94, (1960); and Archives of Biochemistry and Biophysics, 130, 683, (1969). However, these culture fluids or reaction mixtures contain over 50 times the amount of saccharides as compared to the amount of $VB_2$, minerals (inorganic substances), and protein in them. Accordingly, a separation of high purity riboflavinyl glycosides (hereinafter referred as $VB_2$ glycosides) from the enzymatic reaction mixture is required. The methods attempted and reported include adsorption and elution with ion exchange resins, an adsorption and release with florisil, paper, chromatography, the employment of column-chromatography and chromato-pile and a method utilizing the differences of partition coefficients with the employment of counter current equipment. These methods exhibit their disadvantages in that the substances employed in the processes are expensive, and there is the deficiency of catching fire easily and in addition the yields of the product are extremely low. In other words these methods are not suitable for the production of highly pure $VB_2$ glycosides on a large scale and accordingly the methods have not been practised for commercial production.

On studying the various methods suggested for the separation and purification of $VB_2$ glycosides, the inventors discovered that both $VB_2$ and $VB_2$ glycosides can be separated and purified almost completely by reducing highly concentrated saccharide solutions and then crystallizing and precipitating the $VB_2$ glycosides, which were prepared by the reduction to possess low solubilities. The fact that $VB_2$ may be separated by precipitation almost completely from mixture solutions which contain more than 50 times the amount of saccharides than $VB_2$ is not reported in any literature. Accordingly the process provide a method of separation and purification which can be performed with ease. Moreover the inventors found that the removal of impurities, such as salts and proteins, are possible without any adsorption of $VB_2$ and $VB_2$ glycosides by the deionization of the solutions prepared with the reduced precipitates obtained according to the present invention. A desirable process for the separation and purification practicable on a large scale and based on the inventor's discovery was thus established. The process according to the present invention comprises the reaction of a mixture of $VB_2$ and more than 50 times that of saccharides in the presence of a certain enzyme, concentration of the resultant solution which contains $VB_2$ and $VB_2$ glycosides, isolation of the unreacted $VB_2$ by crystallization from the concentrated reaction solution, reduction of the $VB_2$ glycosides, dissolving the precipitates in water and then purification with ion exchange resins of H and OH types to purify the high purity $VB_2$ glycosides.

It is possible to obtain the desired crystals with ease by condensing the thus obtained purified solution in vacuo. The obtained purified $VB_2$ glycosides are free of pyrogens which become a critical problem in the production of injections.

The invention will now be described in detail. All parts and percentages are given by weight. To one or more than two of the members selected from the group comprising disaccharides, such as maltose and sucrose, any variety of starch syrups containing oligosaccharides, and other glycosides, are added less than 2% of $VB_2$ and an enzyme. The employable enzymes in the invention are transglucosidases produced by *Aspergillus oryzae*, *Penicillium spinulosum*, and Mucor genus. The fact that most of the carbohydrates are converted into $VB_2$ glycosides by the transglycosidation on incubating the above mixture is widely known.

However, such a transglycosidation reaction has a relatively low transglycosidation rate and most of the expensive $VB_2$ remains unreacted. Thus the yield is low, resulting in a substantial increase of the cost of the $VB_2$ glycoside product. Accordingly in order to improve the yield of the reacted product, it is necessary to elevate the concentration of such saccharides to an extreme extent. Therefore an amount of saccharides more than 50 times that of $VB_2$ is used. Also in this process most of the added saccharides, more than 50 times that of $VB_2$, remains unreacted after the completion of the reaction, which presents a problem of difficult separation and purification of the resultant $VB_2$ glycosides. In a process described in the literature, most of the residual saccharides are precipitated and removed by the addition of alcohol, then the $VB_2$ glycosides are extracted with phenol to remove the still residual saccharides, and then extracted with water, and then nearly pure $VB_2$ glycosides are obtained by column chromatography, paperchromatography and electrophoresis. A dilute solution prepared from the pure $VB_2$ glycosides is reduced with hydrosulfite to perform crystallization and precipitation. In order to remove the large amount of saccharides and to obtain a more purified product, the complicated procedure of extraction is repeated. Therefore the inventors have discovered an effective method to overcome the disadvantage by crystallizing and then removing the unreacted $VB_2$ crystals after concentration, reducing the resultant high concentrated saccharide solution containing $VB_2$ glycosides with the employment of hydrosulfite, and thus has succeeded in separating the desired glycosides from the saccharides by complete precipitation. There is no literature which describes the reduction of a crude reaction mixture to obtain reduced $VB_2$ glycosides, and then separating the large amount of saccharides, although the procedure is used for the refining of glycosides after purification. No information is provided about the solubility of such glycosides in highly concentrated saccharide solutions.

The inventors established that it is possible to achieve complete separation of $VB_2$ glycosides from saccharides by a reduction in the presence of a large amount of saccharides, resulting in the performing of the following method. In the first stage most of the unreacted $VB_2$ with an extreme low solubility is crystallized and precipitated by condensing the reaction solution, and the precipitates were used again as starting material. The filtration of such precipitates can be performed with ease. $VB_2$ is hardly present in the filtrate which consists predominantly of saccharides. Therefore it is possible to precipitate completely the $VB_2$ glycosides with ease in the form of crystals with extremely low solubility by reduction with the addition of hydrosulfite. The precipitated $VB_2$ glycosides are filtered, washed in an aqueous hydrosulfite solution, and thus the saccharides which were still present in the $VB_2$ glycosides are removed almost completely. If necessary the product is dissolved in the minimum amount of hot water with stirring, cooling and removing the crystallized small amount of $VB_2$. After the removal hydrosulfite is added again, then the reduction product is precipitated. Thus it is possible to filter and recover the $VB_2$ glycosides without hardly any loss of yield. In this manner over 95% of the formed $VB_2$ glycosides are obtainable. The saccharide content in the product can be reduced to less than 0.1%, which means a product of a higher purity, by repetition of the reduction and precipitation procedures. The inventors succeeded in the removal of traces of mineral salts, proteins and amino acids by the use of ion exchange resins.

It is a matter of common knowledge to purify products by removing ionic substances or impurities by the use of ion exchangers. However, there are only a few examples in which the procedure has been utilized for the purification of such glycosides, whereas the most widely used methods are for separating and purifying $VB_2$ or $VB_3$ glycosides by exchange adsorption on basic ion exchange resins and then releasing them slightly from such resins by the use of cationic resins. However the adsorption rate on these resins is extremely low, and thus completely unpracticable for commerical production. In the present invention for the purpose of removing the ionic organic and inorganic substances, strongly cationic exchangers of H type, such as Amberlite IR-120, is employed. Although strongly basic resins adsorb the desired glycosides, moderately basic resins, such as IRA-68, do not absorb glycosides, whereas such resins adsorb and remove impurities, such as salts, proteins and amino acids. On confirming the above findings the inventors established a new and effective utilization of ion exchange resins, which is practicable for the purification of $VB_2$ glycosides.

In accordance with the present invention a pure solution comprising over 99% of $VB_2$ glycosides, and less than 1% of $VB_2$ is obtainable, and pure $VB_2$ glycoside crystals can be obtained by concentration under reduced pressure. Further, over 95% of the $VB_2$ glycosides present in the reaction mixture are recovered.

The advantages of the invention, which has been described hereinbefore, are as follows: (1) Separation of $VB_2$ glycosides from a high concentration saccharides solution at a high yield is possible with ease by reduction. (2) $VB_2$ can be recovered almost completely as crystals and successive use of the crystals is possible. (3) The mother liquor from which the precipitated $VB_2$ glycosides were removed can be purified and used as starch syrups. (4) High purification of the $VB_2$ glycosides is possible with the employment of strongly cationic and moderately basic ion exchange resins, and thus $VB_2$ glycoside products which have higher purities than the conventionally sold products and which are free of pyrogens are available at high yield.

The present invention will be illustrated by the following examples. It is understood that in each example that the procedures were performed in a dark room to prevent decomposition which may be caused by light, especially ultra violet rays.

EXAMPLE 1

A crude extract was prepared by grinding 25 kgs. of commercialized waxy millet and suspending the ground millet in water, saturating with 0.95 ammonium sulfate, and the crude enzyme formed in the precipitate was recovered.

The precipitate was dissolved in 0.1 M acetate buffer (pH 5.3), centrifuged, and 900 ml. of the supernatant was used as an enzyme solution. The enzyme was added to a solution comprising 900 ml. of 0.1 M acetate buffer, 50 gr. of maltose, and 900 mg. of riboflavin, and then the mixture was incubated at 25° C. for six hours. The isolated riboflavin and riboflavinyl were obtained by paper-chromatography by developing the product against a solvent comprising n-butanol, pyridine and water (6:4:3) and paperchromatography using the ascending method twice were determined as follows. The cut spots were extracted, and the absorbances at 450 m$\mu$ were read. The readings upon the completion of the reaction compared with standard curves showed that the product consisted of 17.4% of riboflavinyl glucosides and 82.6% of riboflavin. The reaction mixture was condensed to 600 ml., when perchloric acid was added to give a final concentration of 2%, and centrifuged to remove the present proteins. The supernatant was neutralized to pH 5.0 with a 1 N sodium hydroxide solution, and condensed to 80 ml. The condensed solution was cooled gradually by stirring to 4° C., and maintained at the temperature to allow crystallization. The crystalline riboflavin was centrifuged. The supernatant was added 3.0 gr. of sodium hydrosulfite powder, then the mixture was dissolved with slow stirring, and allowed to stand at 15° C. for 16 hours. The precipitated crystals obtained by centrifugation were dissolved in water by heating. Then the resultant was purified by passing the solution through a column, diameter 1.2 cm., height 30 cm., and packed with ion exchange resins, IR-120 (H type) and IRA-68 (OH type), both which are products of Rohm and Haas Company at S.V. 5 by the descending method. 137 mg. of product consisting of riboflavinyl glycosides 98.7% and riboflavin 1.3% was obtained.

EXAMPLE 2

To one liter of a culture medium containing 40 g. of maltose, 1 g. of ammonium nitrate, 1 g. of sodium nitrate, 1 g. of potassium phosphate, 500 mg. of potassium chloride and 10 g. of calcium carbonate (presterilized and added at the point of inoculation) was added 800 mg. of riboflavin. Following the addition strains of *Mucor javonicus* IFO 4569 were inoculated on the medium. The mixture was then incubated at 30° C. for 40 hours by shaking culture (under shaking conditions). After the completion of the cultivation, the culture broth was separated and determined by paperchromatography, resulting in the finding that the compositions of the product were 74.6% riboflavinyl glucoside and 25.4% riboflavin. The culture broth was then kept at 100° C. for five minutes, filtered to remove the mycellia and the filtrate was condensed to 190 ml.

Then the condensate was cooled gradually to 4° C. and was kept for 16 hours to allow crystallization. The crystalline riboflavin was removed by centrifugation. A mixture obtained by the addition of 8.0 g. of sodium hydrosulfite to the supernatant was dissolved by gradual stirring and left standing at 15° C. overnight. The solution was then centrifuged to recover the precipitated crystals. The crystals dissolved in 130 ml. of water with heating was purified by passing through a column, diameter 1.2 cm., height 30 cm., and packed with ion exchangers, Dowex 50 W (H type) and Dowex 44 (OH type), products of Dow Chemical, at S.V. 5 by the descending method. The purified resultant with a yield of 625 mg. consisted of riboflavinyl glycosides 98.2% and riboflavin 1.8%.

EXAMPLE 3

108 g. of lactose, 2,600 mg. of riboflavin, 814 ml. of 0.2 M phosphate buffer (pH 6.8) and 2,170 ml. of enzyme solution (a product of Nutritional Biochemical Corp., which contains 2,170 mg. of beta-galactosidase) were mixed completely and incubated at 30° C. for 15 hours. Separation and determination by paperchromatography showed that the resultant consisted of 18.2% riboflavinyl galactoside and 81.8% riboflavin. The reaction mixture was condensed to 1,000 ml., perchloric acid was added to give a final concentration of 2%, and then centrifuged to remove the present proteins. The supernatant was then neutralized with 1N-sodium hydroxide solution, and then condensed to 165 ml. Following precipitation of the riboflavin for 16 hours with stirring as described in Example 1, the resultant was centrifuged. The supernatant obtained by recentrifugation was dissolved again in water, reprecipitated with sodium hydrosulfite. The precipitate, thus obtained and dissolved in 90 ml. of water by heating, was purified by passing through an ion exchange column (diameter 1.2 cm., height 30 cm., and packed with IR-122, H type, and IR-45, OH type, products of Rohm and Haas Co. respectively), at S.V. 5 by the descending method. 283 mg. of a product consisting of 99.3% riboflavinyl galactoside and 0.7% riboflavin was obtained.

EXAMPLE 4

Two liters of a culture medium were prepared by admixing completely 200 g. of sucrose, 10 g. of potassium dibasic phosphate, 2 g. of sodium chloride, 400 mg. of magnesium sulfate, 1.2 g. of ammonium sulfate, 400 mg. of yeast extract, 1 g. of polypeptone, 2 g. of liver extract (powder), 80 ml. of fresh tomato juice and 800 mg. of riboflavin. The medium was inoculated with strains of *Streptococcus bovis* IID 9809, and cultured under static at 37° C. for three days. The content of the resultant at the end of the culture was 36.0% riboflavinyl glucoside, and 64.0% riboflavin. To the culture broth was added two liters of ethanol, and allowed to stand at 4° C. for eight hours, and then centrifuged to remove the cells and polysaccharides. The supernatant was condensed to 80 ml. and cooled with gradual stirring to 4° C. and maintained at the temperature for 18 hours to precipitate the riboflavin.

To the supernatant obtained by centrifugation of the resultant crystalline riboflavin was added 3.0 g. of sodium hydrosulfite, and passed according to the same method as described in the other example, through an ion exchange resin column that was packed with IR-200 (H type) and XE 68 (OH type). The yield of the purified product was 184 mg., which consisted of 97.5% riboflavinyl glucoside and 2.5% riboflavin.

What we claim:

1. In the process for the production of riboflavinyl glycosides by the reaction of transglycosidases with mixtures of carbohydrates and riboflavin, the improvement in the separation of the riboflavinyl glycosides from the reaction mixture comprising the steps of:
    (1) concentrating the reaction mixture under reduced pressure, cooling the concentrated mixture until crystallization of unreacted riboflavin is effected, and removing the crystallized riboflavin;
    (2) adding sodium hydrosulfite to the supernatant obtained in step (1) and reacting the mixture until the riboflavinyl glycosides are reduced, cooling the mixture until a precipitate of riboflavinyl glycoside is formed, and recovering the riboflavinyl glycoside precipitate; and
    (3) oxidizing the riboflavinyl glycosides with air.

2. A process according to claim 1, wherein the recovered riboflavin crystals from step (1) are reused.

3. A process according to claim 1, wherein the products obtained are further purified by the repetition of the procedures (1) and (2).

4. A process according to claim 1, wherein impurities are separated from the products obtained by step (2) by the use of moderately basic ion exchange resins.

References Cited

UNITED STATES PATENTS

| | | | |
|---|---|---|---|
| 2,367,644 | 1/1945 | Hines | 260—211.3 |
| 2,822,361 | 2/1958 | Morehouse | 260—211.3 |
| 3,221,008 | 11/1965 | Wolf et al. | 260—211.3 |
| 3,461,113 | 8/1969 | Tanaka et al. | 260—211.3 |

LEWIS GOTTS, Primary Examiner

J. R. BROWN, Assistant Examiner

U.S. Cl. X.R.

260—211.3